(12) United States Patent
Haggard et al.

(10) Patent No.: US 6,471,910 B1
(45) Date of Patent: Oct. 29, 2002

(54) NONWOVEN FABRICS FORMED FROM RIBBON-SHAPED FIBERS AND METHOD AND APPARATUS FOR MAKING THE SAME

(75) Inventors: Jeffrey S. Haggard, Cocoa, FL (US); W. Scott Harris, Lighthouse Point, FL (US); William H. Hills, Melbourne Village, FL (US); Fumin Lu, Tamarac, FL (US); Arnold E. Wilkie, Merritt Island, FL (US)

(73) Assignee: Hills, Inc., West Melbourne, FL (US)

( * ) Notice: Subject to any disclaimer, the term of this patent is extended or adjusted under 35 U.S.C. 154(b) by 0 days.

(21) Appl. No.: 09/533,883

(22) Filed: Mar. 22, 2000

Related U.S. Application Data

(63) Continuation of application No. PCT/US98/25627, filed on Dec. 3, 1998.
(60) Provisional application No. 60/067,280, filed on Dec. 3, 1997, and provisional application No. 60/067,348, filed on Dec. 3, 1997.

(51) Int. Cl.[7] ............................ B32B 5/08; D01D 5/253; D04H 3/00
(52) U.S. Cl. ...................... 264/555; 156/167; 425/72.2; 264/172.17
(58) Field of Search ........................... 264/555, 172.17, 264/172.19; 425/72.2; 156/167

(56) References Cited

U.S. PATENT DOCUMENTS

| | | | |
|---|---|---|---|
| 4,406,850 A | * | 9/1983 | Hills ........................ 264/169 |
| 5,498,468 A | | 3/1996 | Blaney |
| 5,593,768 A | | 1/1997 | Gessner |
| 5,788,993 A | * | 8/1998 | Bryner et al. ............... 264/204 |
| 5,971,731 A | * | 10/1999 | Marin ........................ 425/191 |
| 6,338,814 B1 | * | 1/2002 | Hills ......................... 156/148 |

* cited by examiner

Primary Examiner—Mary Lynn Theisen
(74) Attorney, Agent, or Firm—Edell, Shapiro, Finnan & Lytle, LLC; Patrick J. Finnan

(57) ABSTRACT

Nonwoven fabric is formed from a spunbond process by extruding generally ribbon-shaped fibers 126 through slot-shaped orifices 124 of a spinneret 122. The ribbon-shaped fibers are rapidly quenched after extrusion to achieve a substantially uniform molecular orientation throughout a transverse cross section of the fibers, yielding stronger fibers. The rapid quenching results largely from the relatively high aspect ratio (thinness) of the fibers and the relatively large surface area of the fibers, which permits the fibers to quickly cool throughout the transverse cross section. The ribbon-shaped fibers are drawn longitudinally by an aspirator 128 that exerts a generally downward force produced by an air stream that longitudinally stretches and transversely attenuates the ribbon-shaped fibers in such a manner that the transverse cross-sectional shape of the ribbon-shaped fibers enhances the interaction between the air stream and the ribbon-shaped fibers to maximize the downward force. The attenuated ribbon-shaped fibers are deposited onto a web forming surface 134, such as a moving wire screen belt to form a web. The web is then bonded to form the nonwoven fabric.

12 Claims, 6 Drawing Sheets

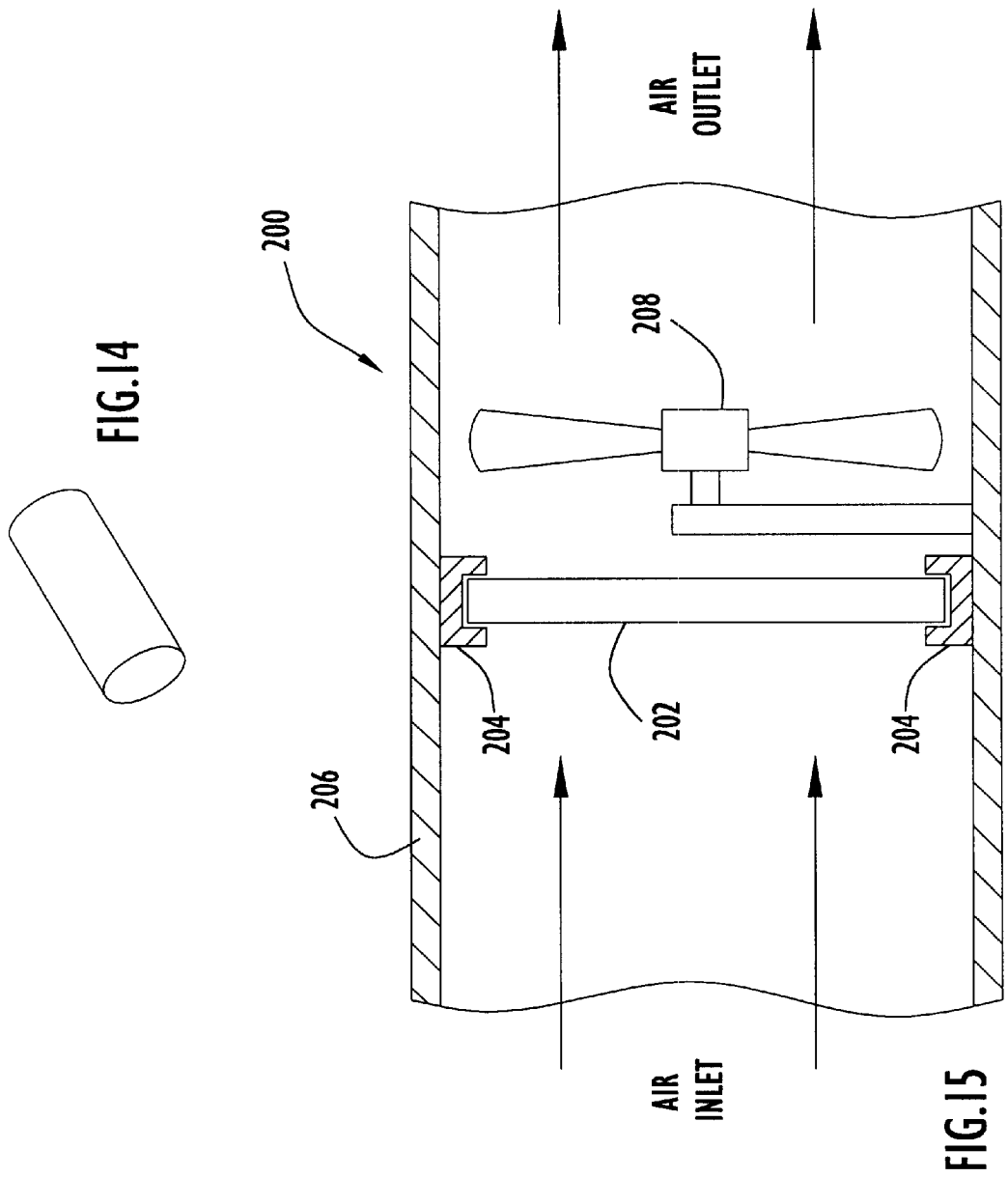

NONWOVEN FABRICS FORMED FROM RIBBON-SHAPED FIBERS AND METHOD AND APPARATUS FOR MAKING THE SAME

CROSS REFERENCE TO RELATED APPLICATIONS

This is a continuation of co-pending PCT International Application PCT/US98/125627, entitled "Nonwoven Fabrics Formed From Ribbon-Shaped Fibers And Method and Apparatus For Making The Same," filed Dec. 3, 1998, the disclosure of which is incorporated herein by reference in its entirety. This application and the aforementioned international application claim priority from U.S. Provisional Patent Application Ser. No. 60/067,280, entitled "Ribbon Fibers in Spunbonded Webs," filed Dec. 3, 1997, and from U.S. Provisional Patent Application Ser. No. 60/067,348, entitled "Ribbon Fibers in Nonwoven Fabrics," filed Dec. 3, 1997. The disclosures of these provisional patent applications are incorporated herein by reference in their entireties.

BACKGROUND OF THE INVENTION

1. Field of the Invention

The present invention relates to improved nonwoven fabrics and melt spinning apparatus and processes for producing such nonwoven fabrics. In particular, the present invention involves the extrusion of ribbon-shaped fibers and the formation of nonwoven fabrics made from synthetic ribbon-shaped fibers having superior coverage, filtration, strength and elongation properties.

2. Description of the Related Art

The most common synthetic textile fibers used in nonwoven fabrics are made from materials such as nylon, polyester or polypropylene polymers. All of these polymers are melt spinnable. Some nonwoven fabrics made from carded or air-laid 25 webs comprise rayon or acrylic fibers. Many of the nonwoven fabrics made from melt-spinnable polymers are produced using a spunbond process. The term "spunbond" refers to a process of forming a nonwoven fabric or web from thin fibers or filaments produced by extruding molten polymers from orifices of a spinneret. The filaments are drawn as they cool (e.g., by an aspirator, positioned below the spinneret, which longitudinally stretches and transversely attenuates the fibers) and are randomly laid on a forming surface, such that the filaments form a nonwoven web. The web is subsequently bonded using one of several known techniques to form the nonwoven fabric. Carded or air-laid webs can also be formed from these polymers.

Fibers having a round (i.e., circular) transverse cross-sectional shape, as shown in FIG. 1, are the most common and least expensive melt spun fibers used to form nonwoven fabrics. Such fibers have a number of limitations, however. For example, fibers having a circular transverse cross-sectional shape tend to be relatively stiff and do not bend as readily as fibers of other cross-sectional shapes; consequently, these round fibers tend to produce fabrics having a texture that is less soft.

For a given fabric basis weight, the shape and stiffness of round fibers produce fabrics having limited surface area coverage, i.e., a significant amount of open area is present between the fibers of the fabric relative to fibers having other cross-sectional shapes. This limited coverage results in a limited ability of the fabric to serve as a filter or barrier material, since gasses, fluids and particulate matter can pass through the gaps or holes between fibers with relative ease.

Further, round fibers inherently have a limited fiber surface area, which has a number of implications for the spunbond process for forming nonwoven fabric as well as for the properties of the fabric itself. Specifically, round fibers extruded in a molten state quench first at the fiber surface and more slowly in the center of the fiber. Significant molecular orientation cannot take place while the polymer is still molten; hence, only the fiber surface is well oriented. This makes the fiber less strong than if it were equally well oriented throughout its cross-section.

The use of round fibers also limits the efficiency of the aspirator. The aspirator or other fiber-drawing mechanism, is designed to longitudinally stretch and transversely attenuate the fibers as they travel substantially vertically downward from the spinneret. This drawing of the fibers is achieved by applying a downward air drag on the fibers, which air drag is produced by air pressure creating a generally-downward, high-velocity air flow. Because of the limited surface area of round fibers, a limited downward air drag on the fibers is induce by the downward air flow, thereby limiting the amount of fiber stretching and attenuation for a given aspirator air pressure and as well as limiting the energy efficiency of the aspirator.

With limited surface area, circular fibers quench relatively slowly and remain in a molten or soft state for a relatively long time after extrusion; consequently, the aspirator used to draw the fibers must be located a significant distance away from the spinneret from which the fibers are extruded to allow sufficient quenching time in order to prevent the fibers from sticking to components of the aspirator. The requirement for this distance between the spinneret and the aspirator causes significant unwanted air drag associated with length of the fiber between the spinneret and aspirator (to be distinguished from the desired downward air drag produced by the aspirator), and reduces the efficiency of the aspirator by requiring more aspirator drawing force (i.e., air pressure) to overcome this pre-aspirator air drag (with less of the drawing force contributing to stretching and attenuating the fibers).

The relatively low surface area of round fibers also limits the usefulness of fabrics made from such fibers in filtration and barrier material applications. Specifically, the round fibers present a limited surface area for collecting or blocking dirt, gasses or fluids. Further, it is more difficult to apply finish oil or other topical treatments to fabrics formed from round fibers.

Fibers having other transverse cross-sectional shapes, such as a delta shape (FIG. 2) or a Y shape tend to give a slightly greater fiber stiffness relative to fibers having a round transverse cross section, and may also add sparkle to the fiber appearance. Hollow fibers can conserve polymer and reflect light in a desirable manner. FIG. 4 illustrates a conventional hollow fiber having a circular transverse cross-sectional shape and a single, concentric longitudinal cavity. A plural cavity hollow fiber is shown in FIG. 5 in which four circular longitudinal cavities arranged transversely in a square pattern extend through a fiber having a substantially square transverse cross-sectional shape. Thus, fibers whose transverse cross sections are other than round can provide certain advantages. However, none of these fibers overcomes all of the aforementioned limitations of round fibers.

While some use has been made of fibers with flat or ribbon-shaped cross sections, there have been no known attempts to form nonwoven fabrics from fibers extruded with a ribbon-shaped cross section. Nor has there been any significant investigation into the possible advantages of using such extruded ribbon-shaped fibers in nonwoven fabrics.

U.S. Pat. No. 5,498,468 to Blaney, the disclosure of which is incorporated herein by reference in its entirety, discloses a process of extruding sheath-core conjugate filaments having a substantially circular transverse cross-sectional shape, and applying a flattening force to the filaments with a calendar roll arrangement to flatten the circular filaments into ribbon-like filaments. The method requires that the core polymer have a lower softening point than the sheath polymer such that, when the filaments are heated to the softening point of the core polymer, the flattening force causes the filaments to deform in accordance with deformation of the core without causing the sheath to soften, thereby preventing adjacent fibers from fusing in the flattening process. While fabrics formed from the flattened fibers purportedly exhibit superior coverage properties (i.e., reduced open area in the fabric), the fibers are extruded with circular cross-sectional shapes; consequently, any potential advantages of extruding ribbon-shaped fibers are not suggested by and cannot be realized in this system. Moreover, the process is limited to sheath-core conjugate fibers wherein the core component has a lower softening point than the sheath component; thus, the process does not have general applicability to fibers other than those with this specific conjugate fiber configuration.

U.S. Pat. No. 5,593,768 to Gessner, the disclosure of which is incorporated herein by reference in its entirety, discloses a process for forming a nonwoven fabric laminate from a thermally bonded multiconstituent fiber nonwoven web. Specifically, the fibers of the web are formed of two highly intermixed polymer components, one of which has a lower softening point which facilitates bonding of the fibers in the web. In order to enhance bonding, it is desirable to maximize the amount of the low softening point component that is at the surface of the fibers. As explained in the disclosure, this can be achieved by increasing the surface-to-volume ratio of the fiber, which is an attribute of ribbon-shaped fibers. However, while this patent appears to suggest an advantage of ribbon-shaped fibers in the narrow context of thermal bonding of plural intermixed component fibers, the disclosure contains no suggestion to extrude ribbon-shaped fibers, and, if anything, the examples provided in the disclosure suggest that a ribbon-shape is achieved by flattening round fibers during the thermal bonding process.

SUMMARY OF THE INVENTION

It is an object of the present invention to produce nonwoven fabric having enhanced coverage for a given basis weight.

It is a further object of the present invention to produce nonwoven fabric with increased surface area for a given basis weight.

It is a still further object of the present invention to produce nonwoven fabric having superior fluid and/or particulate filtration and barrier properties.

It is another object of the present invention to produce soft, flexible nonwoven fabric.

It is yet another object of the present invention to form a fiber web that can more readily be bonded to form nonwoven fabric.

It is still another object of the present invention to produce nonwoven fabric to which a topical treatment can more readily be applied.

A further object of the present invention is to increase the energy efficiency of a spunbond process by reducing the energy required to draw extruded fibers, reducing the suction force required to deposit fiber on a web-forming surface, and/or reducing the energy required to bond the fiber web.

A still further object of the present invention is to achieve higher fiber velocities while drawing extruded fibers without increasing aspirator air pressure in order to achieve lower denier fibers without an attendant increase in energy cost.

Another object of the present invention is to produce stronger nonwoven fabric.

Yet another object of the present invention is to produce nonwoven fabric having superior elongation properties.

Still another object of the present invention is to more rapidly quench extruded polymeric fibers, enabling reductions in capital equipment and fiber production costs.

The aforesaid objects are achieved individually and in combination, and it is not intended that the present invention be construed as requiring two or more of the objects to be combined unless expressly required by the claims attached hereto.

According to the present invention, nonwoven fabric is formed from a spunbond process by extruding generally ribbon-shaped fibers through slot-shaped orifices of a spinneret. The ribbon-shaped fibers are rapidly quenched after extrusion to achieve a substantially uniform molecular orientation throughout a transverse cross section of the fibers, yielding stronger fibers. The rapid quenching results largely from the relatively high aspect ratio (thinness) of the fibers and the relatively large surface area of the fibers, which permits the fibers to quickly cool throughout the transverse cross section. The ribbon-shaped fibers are drawn longitudinally by exerting a generally downward force produced by an air stream that longitudinally stretches and transversely attenuates the ribbon-shaped fibers in such a manner that the transverse cross-sectional shape of the ribbon-shaped fibers enhances the interaction between the air stream and the ribbon-shaped fibers to maximize the downward force. The attenuated ribbon-shaped fibers are deposited onto a web forming surface, such as a moving wire screen belt to form a web. The web is then bonded to form the nonwoven fabric.

The formation of nonwoven fabric from ribbon-shaped fibers provides a number of unexpected benefits. In particular, fabric of a given basis weight has more coverage when formed from ribbon-shaped fibers rather than from round fibers or fibers of other cross-sectional shapes. Nonwoven fabric formed from ribbon-shaped fibers has enhanced filtration properties, because the fabric collects more dirt and/or pass less fluid (gas or liquid) due to the greater fiber surface area for a given basis weight. Further, nonwoven fabric formed of ribbon-shaped fibers is softer than nonwoven fabric formed of fibers of other transverse cross-sectional shapes, since each ribbon-shaped fiber can bend more easily, and the ribbon-shaped fibers can be bonded more easily than round fibers, since the flat surface of adjacent ribbon-shaped fibers in contact with each other form a greater contact area between the fibers.

Further, the greater surface area of each ribbon-shaped fiber allows the downwardly directed air in the aspiration to "grip" the fiber better due to increased downward drag on the fibers, hence achieving a fiber velocity closer to the aspirator's downward air velocity. This increased fiber velocity results in fibers of desirably lower denier at a given air pressure and air consumption. The rapid quenching permits the aspirator to be located closer to the spinneret without the danger of the fibers sticking to the metal aspirator parts. This also reduces upstream air drag on the fibers, allowing the fiber tension generated by the aspirator to carry up to the spinneret with less loss due to the upstream air drag, with more of the aspirator drawing force contributing to attenuation of the ribbon-shaped fibers. The higher fiber tension at the spinneret results in still lower denier and still greater orientation.

Since the ribbon-shaped fibers of the present invention bend very easily in one direction, they tend to bend in that direction and lay down in smaller coils than round fibers and are more easily carried by the fan-driven laydown air into open areas amongst the fibers already laid down, thereby tending to fill in holes in the web and to make a more uniform looking fabric. The ribbon-shaped fibers tend to lay down preferentially more in the machine direction than in the direction transverse thereto. As a result, the nonwoven fabric has a greater strength and stretchability in the machine direction than a comparable fabric formed from round fibers.

The present invention is not limited to nonwoven fabrics formed from spunbond process and encompasses process for forming fabric from ribbon-shaped fibers that do not require bonding of the fibers (e.g., spun-laid or air carding processes). Further, the present invention can be applied in melt blown systems. The benefits of using ribbon-shaped fibers are not limited to systems that form webs from continuous filaments, and the present invention encompasses processes for forming nonwoven fabrics from ribbon-shaped staple fibers.

Further, formation of ribbon-shaped fibers in accordance with the present invention can be performed in conjunction with other extrusion and fabric or material formation techniques. For example, both ribbon-shaped and non-ribbon shaped-fibers can be extruded from a single spinneret to create a web having a mixture of different types of fiber shapes. Further, a web formed from ribbon-shaped fibers can be coupled to (e.g., bonded to) non-ribbon webs or laminates in, for example, a multi-layered product.

The nonwoven fabric formed by the process of the present invention is useful in any product where properties such as softness, strength, stretchability, filtration or fluid barrier properties, and high coverage at a low fabric weight are desirable or advantageous, including, but not limited to: disposable absorbent articles; medical barrier fabrics; filtration media; and clothing liners.

The above and still further objects, features and advantages of the present invention will become apparent upon consideration of the following detailed description of a specific embodiment thereof, particularly when taken in conjunction with the accompanying drawings wherein like reference numerals in the various figures are utilized to designate like components.

BRIEF DESCRIPTION OF THE DRAWINGS

FIG. 14 is a perspective view of a cigarette filter comprising nonwoven fabric formed from the process of the present invention.

FIG. 15 is a cross-sectional side view in elevation of a ventilation air filtration system employing an air filter comprising nonwoven fabric formed from the process of the present invention.

DESCRIPTION OF THE PREFERRED EMBODIMENTS

The present invention involves improvements to processes and apparatus for producing nonwoven fabrics by taking advantage of the heretofore unknown benefits, discovered by the present inventors, of the use of ribbon-shaped fibers in nonwoven fabrics. The terms "ribbon-shaped fiber(s)" or "generally ribbon-shaped fiber(s)," as used herein and in the claims, are defined in contrast to fibers having a circular transverse cross-sectional shape, i.e., "round" fibers. Specifically, these terms refer to fibers that have, at a given transverse cross section, a transverse cross-sectional area that is the same as the transverse cross-sectional area of a round fiber, wherein the transverse section outer perimeter enclosing that area of the "ribbon-shaped" fibers is at least 40% greater than the transverse section outer perimeter enclosing that area of the round fiber of corresponding area. In other words, a fiber is a "ribbon-shaped" fiber or "generally ribbon-shaped" fiber if the transverse section outer perimeter of the fiber is at least 40% greater than the perimeter of a round fiber having the same cross-sectional area. As used herein and in the claims, the terms "ribbon-shaped fiber(s)" or "generally ribbon-shaped fiber(s)" also require that the aspect ratio of the fiber be at least approximately 3.0. The aspect ratio is defined as the ratio of the length to width of the transverse cross section of the fiber.

From the above definition of "ribbon-shaped" or "generally ribbon-shaped," it will be understood that these terms encompass both fibers having a true flattened ribbon shape and other fibers that are not strictly in the shape of a conventional ribbon. For example, ribbon-shaped fibers as defined herein include fibers having elliptical transverse cross sections, "dog bone" cross-sections, fibers whose sides are not strictly flat, and fibers having somewhat irregular cross sectional shapes, provided such fibers meet the perimeter and aspect ratio requirements of the foregoing definition. As will be understood more fully from the following description, the perimeter and aspect ratio criteria relate to the ability of the ribbon-shaped fibers to quench quickly after extrusion and the ability of the fibers to be efficiently drawn at high speed through an aspirator to achieve a high degree of fiber attenuation at relatively low aspirator air velocities.

Figure 6:
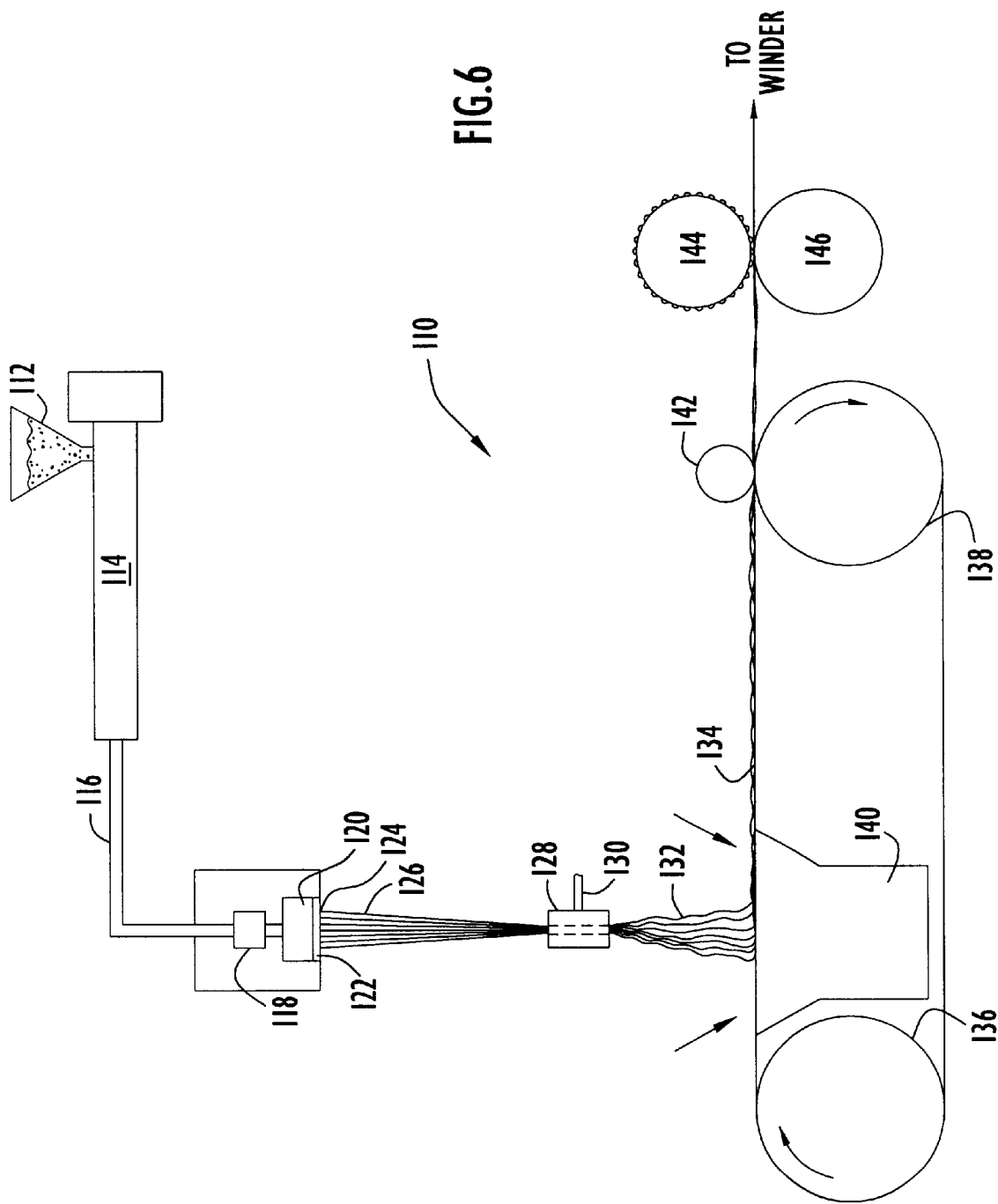
FIG. 6 is a diagrammatic view of an apparatus for performing a spunbond process for forming nonwoven fabric in accordance with an exemplary embodiment of the present invention.

FIG. 6 diagrammatically illustrates an apparatus 110 for producing nonwoven fabric from an in-line spunbond process employing ribbon-shaped fibers in accordance with an exemplary embodiment of the present invention. The term "in-line", as used herein refers to a process wherein fiber extrusion, web formation and web bonding are performed in a single, continuous process (i.e., not in-line would be if the extruded fibers are made into a roll and then split or formed into a web separately).

Apparatus 110 includes a hopper 112 into which pellets of a polymer are placed. The polymer is fed from hopper 112 to screw extruder 114 which melts the polymer. The molten polymer flows through heated pipe 116 to metering pump 118 which in turn feeds the polymer stream to a suitable spin pack 120. Spin pack 120 includes a spinneret 122 with slot-shaped orifices 124 which shape the fibers extruded therethrough. For example, orifices 124 may be arranged in a substantially horizontal, rectangular array, with each orifice extruding a ribbon-shaped fiber.

Figure 10:
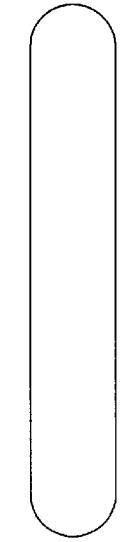
FIG. 10 is a transverse cross-sectional view of a ribbon-shaped fiber having an intermediate aspect ratio.
Figure 8:
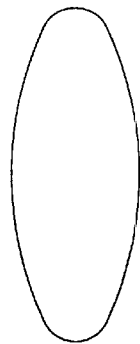
FIG. 8 is a transverse cross-sectional view of a ribbon-shaped fiber having a relatively low aspect ratio.
Figure 9:
FIG. 9 is a transverse cross-sectional view of a ribbon-shaped fiber having a relatively high aspect ratio.
Figure 7:
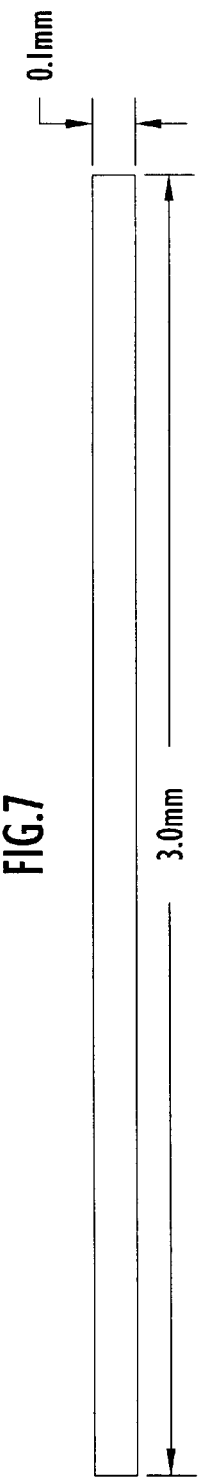
FIG. 7 is a plan view of a slot-shaped orifice of the spinneret of the exemplary embodiment of the present invention.

The transverse cross-sectional shape (plan view) of a single, slot-shaped orifice of spinneret 122 is shown in FIG. 7. By way of non-limiting example, the orifice has a width of 0.1 mm and a length of 3.0 mm and can be used to melt spin a wide range of fiber aspect ratios below 30.0 by adjusting the polymer temperature, the polymer viscosity, the polymer type, and the rapidity of fiber cooling below the spinneret. A low polymer temperature, high polymer viscosity, and/or fast cooling tend to make a fiber cross-section more like the spinneret orifice shape. If the polymer is exceptionally hot, low in viscosity, and/or cooling occurs slowly, the polymer stream will have time to round out before quenching, and an elliptical shape fiber of low aspect ratio will result. FIG. 8 is a transverse cross-sectional view of a ribbon-shaped fiber with a relatively low aspect ratio of 3.0 (length/width). FIG. 9 is a transverse cross-sectional view of a ribbon-shaped fiber with the relatively high aspect ratio of 30.0. FIG. 10 is a transverse cross-sectional view of a ribbon-shaped fiber with an intermediate aspect ratio of 6.0. It has been found by the present inventors that fiber cross-sections with an aspect ratio from approximately 3 to 40 are particularly useful for forming nonwoven fabrics in accordance with the present invention.

While FIG. 6 shows a single polymer component being melted, spun and extruded from the spinneret, it will be understood that plural polymer components can be melted, spun and extruded from the spinneret to form the ribbon-shaped fibers. Each ribbon-shaped fiber can have a substantially uniform composition throughout its transverse cross section (either a mono-component filament or a fiber comprising plural intermixed components), or each ribbon-shaped fiber can be a conjugate fiber with distinct fiber segments formed from different components. Further, the ribbon-shaped fibers can be of the splittable or non-splittable type.

The ribbon-shaped fibers can comprise any one or combination of melt spinnable resins, including, but not limited to: homopolymer and copolymers of polypropylene, polyethylene (e.g., polyethylene terephthalate), polyester, polyactic acid, nylon and poly(trimethylene terephthalate).

Referring again to FIG. 6, an array of ribbon-shaped fibers 126 exit the spinneret 122 of spin pack 120 and are pulled downward by a drawing unit 128, such as an aspirator, which is fed by compressed air or steam from a pipe 130. Specifically, aspirator 128 uses air pressure to form an air flow directed generally downward, which creates a downward air drag on the fibers, thereby increasing the velocity of the portion of the fibers in and below the aspirator relative to the velocity of the portion of the fibers above the aspirator. The downward drawing of the ribbon-shaped fibers longitudinally stretches and transversely attenuates the fibers. Aspirator 128 can be, for example, of the gun type or of the slot type, extending across the full width of the fiber array, i.e., in the direction corresponding to the width of the web to be formed by the fibers.

Aspirator 128 delivers attenuated fibers 132 onto a web-forming screen belt 134 which is supported and driven by rolls 136 and 138. A suction box 140 is connected to a fan (not shown) to pull room air (at the ambient temperature) through screen belt 134, causing fibers 132 to form a nonwoven web on screen 134. The web passes through an optional compaction roll 142 and then leaves the screen and passes through a nip formed by heated calendar rolls 144 and 146. One of the calendar rolls is embossed to have raised nodules which fuse the fibers together only at the points where the nodules contact the web, leaving the fibers between the bond points still bulky and giving the resultant bonded nonwoven fabric good flexibility and drape.

The present inventors have discovered a number of unexpected benefits from using ribbon-shaped fibers to form nonwoven fabrics. One important benefit of the use of ribbon-shaped fibers in nonwoven fabrics is that a fabric of a given basis weight (oz/sq. yd. or gm/sq. mm) has more coverage when formed from ribbon-shaped fibers rather than from round fibers or fibers of other cross-sectional shapes. Another advantage is that nonwoven fabric formed from ribbon-shaped fibers has enhanced filtration properties, because the fabric collects more dirt and/or pass less fluid (gas or liquid) due to the greater fiber surface area for a given basis weight.

Optionally, the fabric can be calendared to make the fibers orient themselves with the flat face of each fiber predominantly lying in the plane of the fabric. This calendaring results in finer filtration, because the flat fiber surfaces of the ribbon-shaped fibers leave smaller holes between fibers through which particulate matter or fluid can pass.

Provided the ribbon-shaped fibers of the fiber web are not bonded too heavily, nonwoven fabric formed of ribbon-shaped fibers is softer than nonwoven fabric formed of fibers of other transverse cross-sectional shapes, since each ribbon-shaped fiber can bend more easily. Specifically, the shape of the ribbon produces a very low bending modulus (i.e., the fiber can twist and bend in three dimensions).

If desired, nonwoven fabric formed from ribbon-shaped fibers can be bonded more heavily than fabric formed from round fibers, since the flat surface of adjacent ribbon-shaped fibers in contact with each other form a greater contact area between the fibers than the contact area formed between two round fibers. Furthermore, the greater fiber surface area of ribbon-shaped fibers allows a heavier application of finish oil or other topical treatment to be applied to nonwoven fabric formed from these fibers, if such a topical treatment is desired.

The aforementioned benefits apply to any nonwoven fabric regardless of how the fabric is made. A number of additional benefits apply specifically to nonwoven fabric formed from spunbond webs and the method of producing such webs. In particular, the greater surface area (resulting from a larger transverse perimeter and a high aspect ratio) of each ribbon-shaped fiber allows the downwardly directed air in the spunbond aspiration unit to "grip" the fiber better due to increased downward drag on the fibers, hence achieving a fiber velocity closer to the aspirator's downward air velocity. This increased fiber velocity results in fibers of desirably lower denier at a given air pressure and air consumption. Put another way, the increased downward drag permits a lower air pressure and air consumption to produce ribbon-shaped fibers having the same denier as a round fibers drawn at higher air pressures, hence providing the potential to reduce energy costs.

If the spunbond process is operated to achieve the lowest denier possible with ribbon-shaped fibers, greater fiber molecular orientation will result, yielding stronger fibers. Specifically, round fibers quench first at the surface and more slowly in the fiber center. Significant molecular orientation cannot take place while the polymer is still molten; hence, only the fiber surface is well oriented. This relatively slow quenching makes the fiber less strong than if it were equally well-oriented throughout its cross-section. In contrast, ribbon-shaped fibers are very thin (i.e., have a high aspect ratio) and quench more quickly, allowing more uniform orientation and a higher average orientation level throughout the transverse cross-section of the fiber. The substantially uniform molecular orientation achieved with the rapid quenching of ribbon-shaped fibers results in relatively strong fibers and, consequently, stronger nonwoven fabric.

Further, since ribbon-shaped fibers quench more quickly, the spunbond aspirator can be located closer to the spinneret without the danger of the fibers sticking to the metal aspirator parts. If the distance from spinneret to aspirator is reduced, air drag on the fibers upstream of the aspirator is also reduced (as previously explained, this undesirable upstream air drag is to be distinguished from the downward air drag induced by the aspirator to effect drawing of the fibers). This reduction in upstream air drag allows the fiber tension generated by the aspirator to carry up to the spinneret with less loss due to the upstream air drag, with more of the aspirator drawing force contributing to longitudinally stretching and transversely attenuating the ribbon-shaped fibers. The higher fiber tension at the spinneret results in still lower denier and still greater orientation relative to the case where ribbon-shaped fibers are extruded with the aspirator not moved closer to the spinneret.

As previously explained, after the ribbon-shaped fibers leave the aspirator, they are deposited on a screen wire forming belt to form a spunbond fabric. Normally, a fan of a suction unit is used to create suction to pull air through the forming belt to augment the downwardly-directed air of the aspirator and gravity. Since, the fibers are continuous, they must coil around in order to lay down on the wire. Stiff fibers (e.g., those having large denier or round transverse cross sections) will tend to coil in larger circles than finer or more limber fibers. Since the ribbon-shaped fibers of the present invention bend very easily in one direction, they tend to bend in that direction and lay down in smaller coils than round fibers. Further, since the ribbon-shaped fibers bend more easily, they can more easily be carried by the fan-driven laydown air into open areas amongst the fibers already laid down, thereby tending to fill in holes in the web and to make a more uniform looking fabric. The ribbon-shaped fibers are also more tightly held on the belt surface by the fan laydown air, which is particularly useful with high belt speeds, fine fiber deniers, and/or low fabric weights.

It has been observed in experiments by the present inventors that ribbon fibers tend to lay down preferentially more in the machine direction (i.e., the direction in which the forming belt is traveling) and less in the cross direction than round fibers. As a result, the nonwoven fabric has a greater strength than a comparable fabric formed from round fibers and a greater strength in the machine direction (the longitudinal direction of the fabric) than in the direction transverse thereto. This property of the fabric is particularly beneficial if high strength in the machine direction is desired, as is commonly the case with card-web fabrics. Note, however, that this property can be undesirable if a highly isotropic fabric is sought.

Further, the elongation properties of nonwoven fabrics are enhanced by the used of ribbon-shaped fibers. In particular, it was experimentally found by the present inventors that nonwoven fabric formed from ribbon-shaped fibers could be elongated to a breaking point considerably more than nonwoven fabric of the same basis weight formed from round fibers.

It has been found by the present inventors that the unbonded web produced with high aspect ratio fibers exhibits unusually and unexpectedly high fabric strength. This property is particularly advantageous for uninterrupted web transfer from the forming section through the bonding unit. Specifically, this high strength allows wider flexibility in forming fabric designs, since the release from the wire belt becomes less of a consideration. This strength feature also permits wider flexibility in the forming table design, since the web is more robust with respect to handling. Potentially this flexibility will allow radically different webformer configurations for laminate/composite web applications. Finally, the increased strength of the unbonded web allows use of polymers or combinations of polymers and/or additives that are difficult or previously impossible to run at high speed/low basis weight due to wire belt release problems associated with high levels of static electricity.

In addition to the aforementioned improvements in nonwoven fabrics, the use of ribbon-shaped fibers in melt spun processes (inclusive of spunbond and staple processes) results in certain additional process improvements. Specifically, as previously explained, the generally flat transverse cross-section of ribbon-shaped fibers allows more rapid fiber quenching in the spinning process. This quicker quenching permits the spinning orifices to be put closer together in the spinneret without the danger of fibers fusing together prior to their becoming stick-free. This, in turn, allows more fibers to be spun from a given spinneret, reducing capital equipment cost and fiber production cost. Higher spinning speeds and/or production rates (grs/min/filament) can also be achieved.

As will be understood from the above description, there are a great many benefits provided by ribbon-shaped fibers in spunbonded and conventional nonwoven fabrics, most of which have not been understood or utilized in the prior art. Ribbon fibers can also be mixed with fibers of other cross-sections in a fabric to achieve properties intermediate between the properties of fabrics with all fibers of one type.

An example of system parameters that can be used to form a nonwoven web in accordance with the present invention are provided in Table 1. It is to be understood that the parameters in Table 1 are provided by way of example only and are not in any way limiting on the scope of the invention.

TABLE 1

| | |
|---|---|
| Polymer: | 35 MFR polypropylene |
| Polymer Flow Rate: | 0.5 grams/hole/minute |

TABLE 1-continued

| | |
|---|---|
| Spinneret Orifice: | 0.12 mm × 2.5 mm (cross-section), 0.8 mm (long) |
| Fiber Cross-section: | Ribbon (aspect ratio: 6:1) |
| Aspirator: | 6 in. wide slot aspirator with 0.015 in. gap |
| Aspirator Air Pressure: | 20 psig |
| Estimated Fiber Exit Velocity at Aspirator: | 2,800 meters/minute |
| Belt Speed: | 30 meters/minute |

In accordance with one embodiment of the present invention, an improvement to the system for making spunbonded webs described in U.S. Pat. Nos. 5,545,371 and 5,688,468, the disclosures of which are incorporated herein by reference, involves the extrusion of ribbon-shaped fibers rather than round fibers. One embodiment disclosed in these patents relates to a process wherein a slot-type aspirator drawing unit is positioned quite close to a long, rectangular spinneret. The running position of the aspirator is too close to the spinneret to permit proper startup of polymer flow from the spinneret; consequently, the aspirator is lowered and the aspirating air pressure is reduced for startup. After the fibers are formed and are passing through the aspirator, the air pressure is gradually increased and the aspirator is gradually brought closer to the spinneret. This results in better attenuation of the fibers, hence lower denier fibers being deposited on a forming wire which is positioned adjustably at an optimum distance below the aspirator. The lower denier fibers with greater molecular orientation produce a superior spunbonded web.

Figure 11:
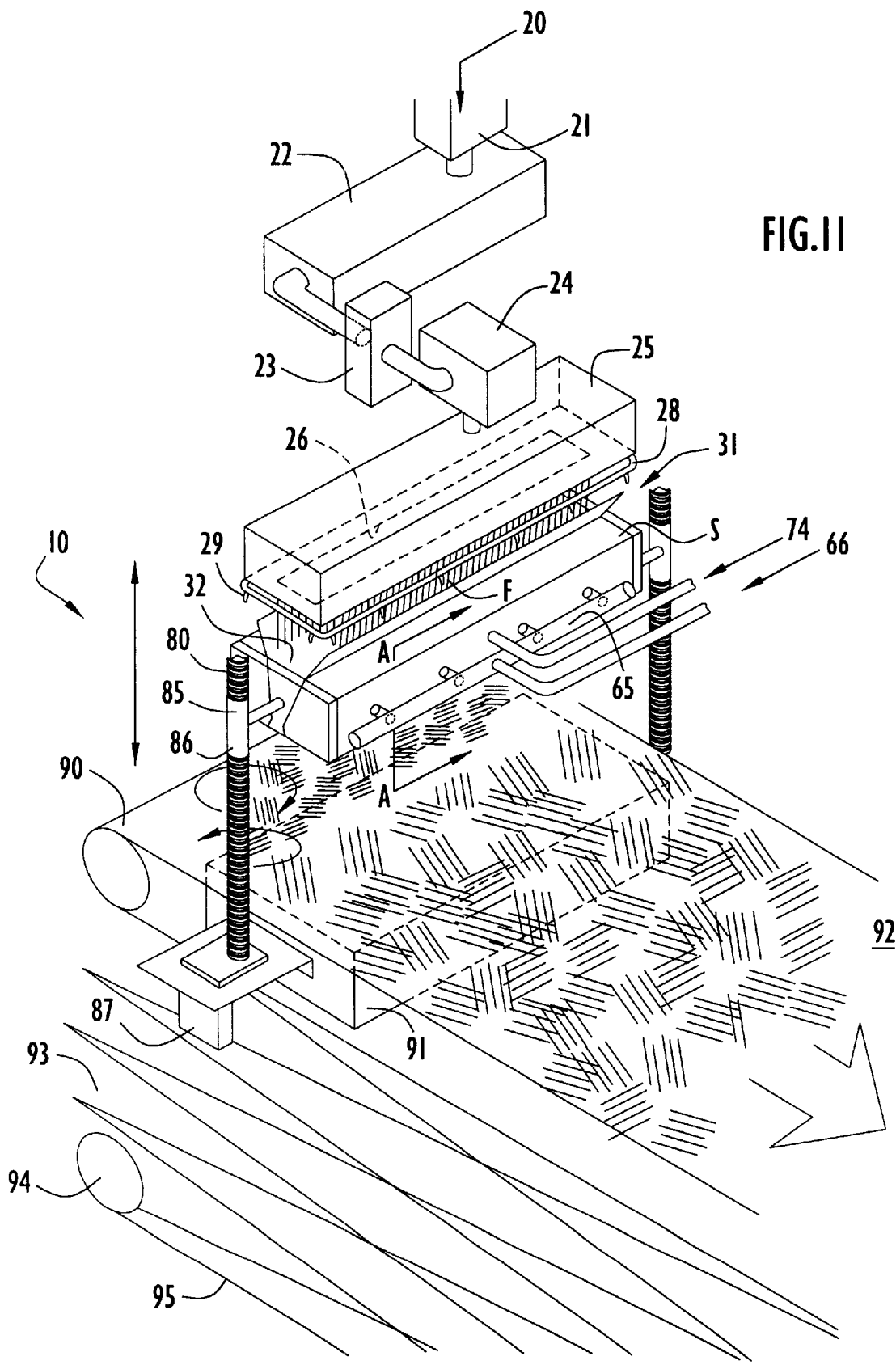
FIG. 11 is a perspective view of an apparatus for forming nonwoven fabric from ribbon-shaped fibers in which the aspirator and web forming surface are positionally adjustable.

Referring to FIG. 11, an improved melt spinning machine 10 includes an extruder 22, spinbeam 25, and drawing unit 31. The extruder 22 and spin beam 25 are fixedly mounted to a floor support above a movable drawing unit 31. The drawing unit 31 is movably supported above a movable mesh wire belt conveyor 92 that is a component of a web forming table 90. The web forming table further comprises an vertically adjustable base 93 which can be used to adjust vertically the distance between the top of the table 90 and the spinneret 26 in a range of approximately 30 to 150 cm. Wheels 94 under the base 93 are mounted on a pair of tracks 95 so that the web forming table 90 can be moved back and forth horizontally to allow certain space for changing of the spinneret 26.

Polymer is fed from polymer supply 20 into hopper 21 where the polymer is heated and melted in extruder 22, pushed through filter 23 and metering pump 24 to spin beam 25, where the polymer is then extruded through a spinneret 26 having a plurality of multi-rowed orifices, together forming a curtain of vertically downwardly advancing ribbon-shaped fibers F.

The drawing unit 31, which acts to attenuate the fibers, includes an elongated longitudinal slot 32 which is strategically aligned below the spinneret to receive the curtain of fibers which are moved by gravity and air pressure. The most important distance with respect to fiber size and throughput volume after initial startup is established is the distance between the base of spinneret 26 and the top of the drawing unit 31. The fibers F, before being sucked in and drawn by the drawing unit 31, are cooled and partially solidified by a fast moving stream of mixture of air (and optionally atomized water) entrained by the suction of the drawing unit 31 of ambient air with mist produced by a water spray unit 28.

Figure 12:
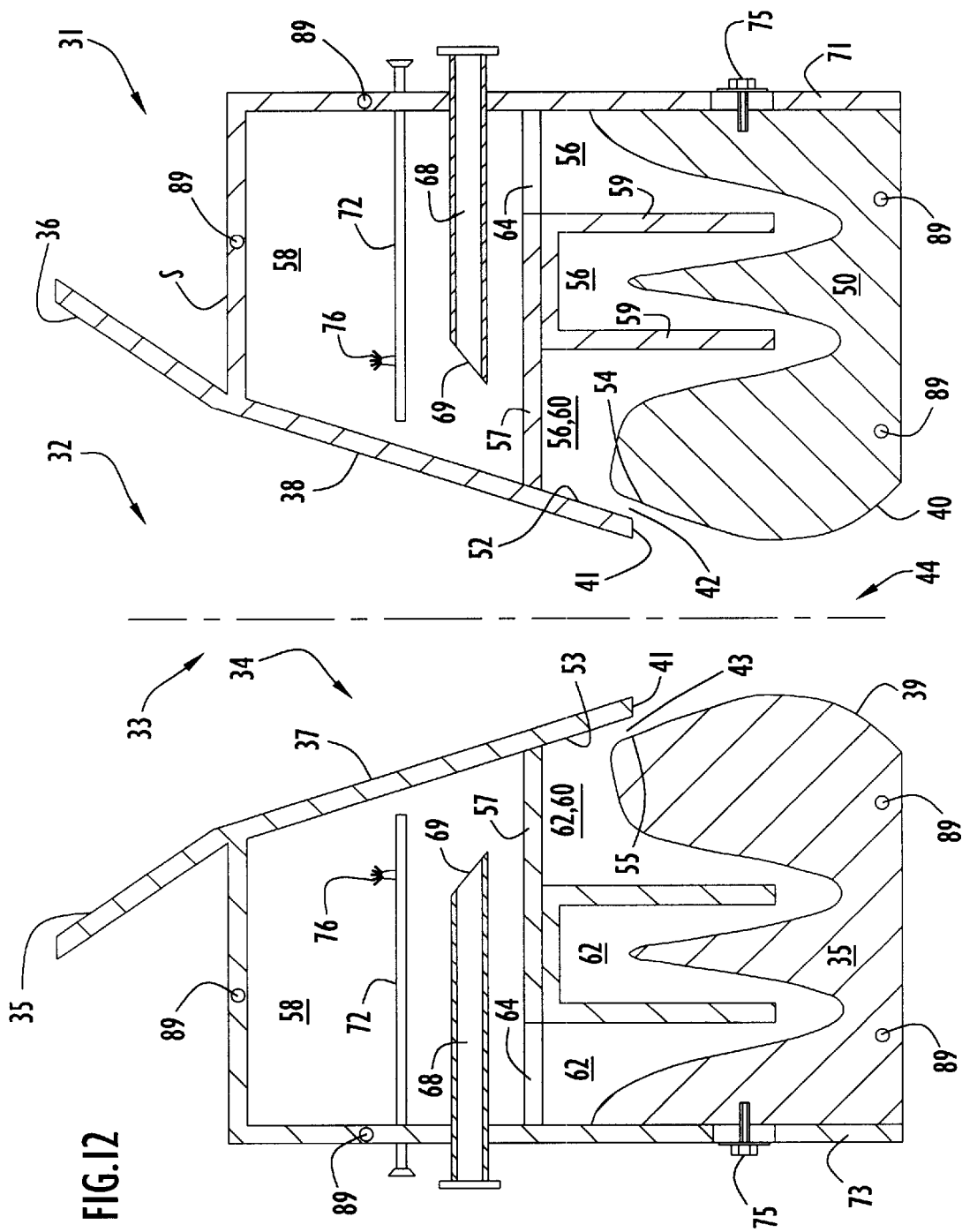
FIG. 12 is a cross-sectional side view in elevation of the drawing unit of the apparatus shown in FIG. 11.

Referring to FIG. 12, the drawing unit 31 includes slot 32 having a horizontally directed, elongated open top slot segment 33 that includes a pair of side walls 35 and 36 projecting from upper surface S of the drawing unit 31 at an angle of up to 90°. The drawing unit 31 also includes upper slot segment 34 comprising a pair of side walls 37 and 38 which depend from the top slot segment 33 at an angle of substantially between 15° to 60° and preferably, 30° to 45°. The slot 32 further comprises a lower slot segment 44 having lower side walls of a pair of bottom blocks 50 and 51. Transverse shoulders 41 are positioned between the upper and lower slot segments 34 and 44 on each side of the slot 32. A pair of air nozzles 42 and 43 on each side of slot 32 extend along the entire longitudinal length of the slot 32 and are formed between inner surfaces of the lower end of the upper slot side walls 37 and 38 and the opposing surfaces 54 and 55 of bottom blocks 50 and 51.

An air passageway 56 extends along the entire longitudinal length of the slot 32 of drawing unit 31 and is defined by separation plate 57 at the bottom of air chamber 58, having two vertically sectional plates 59 attached, and a curved surface of bottom blocks 50 and 51. The air passageway 56 is divided into two segments, a discharge segment 60 connected with nozzles 42 and 43 having a gradually smoothly reducing width in the direction towards the associated nozzle, and a unifying segment 62 that contains four parallel vertical sections in an arcuately curved section between each pair of vertical sections. The unifying segment of the air passageway 62 is connected with the air chamber 58 through an air window 64 which is a brake plate placed at the edge of the separation plate 57 adjacent side walls 70 and 71 of the drawing unit 31.

Air is fed to air chamber 58 through a manifold 65 connected to a suitable air supply unit 66 (see FIG. 11). The air chamber 58 comprises a number of air lines 68 coming into air chamber 58 from manifold 65 and having an open end 69 facing up and close to side walls 37 and 38 of the upper slot segment. The arcuately curved section of the air passageway in the unifying segment creates an air pressure drop which serves to equalize the air volume flow rate and velocity along the entire longitudinal length of the slot 32, especially at the outlet of the nozzles 42 and 43. The area for the passage of air decreases gradually along the air passageway from air window 64, all the way to the outlet of the nozzles 42 and 43, which also serve to unify the air pressure. As a result, the air flow at the outlet of the nozzles 42 and 43 will be uniform in volume and velocity along the entire longitudinal length of slot 32.

The air chamber 58 further includes a number of water spray heads 76 (optional) installed and in fluid communication with water inlet pipe 72 connected to a water supply unit 74. The mist from the water spray heads serves to cool down the incoming air from the air supply unit 66, which facilitates the solidification of fibers contacting the air stream.

The bottom blocks 50 and 51 of the drawing unit are constructed in such a way that the upper surfaces of the blocks, which define the air passageway with the separation plates 57 and two vertical sectional plates 59, comprise two downwardly arcuately curved and one upwardly arcuately curved edge. The two downwardly curved edges have different depths. The edge closer to the air window 64 is 2 to 10 mm longer than the other edge. The bottom blocks 50 and 51 of the drawing unit are connected with side walls 73 and 71 of the drawing unit by a plurality of bolts 75 through extended holes on the upside walls 71 and 73 so that the positions of the blocks can be adjusted up or down to change the gap of the nozzles 42 and 43 and therefore the volume and velocity of air flow according to the needs of the process.

Figure 3:
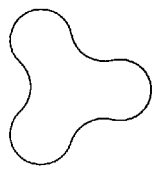
FIG. 3 is a transverse cross-sectional view of an extruded fiber having a Y transverse cross-sectional shape.
Figure 2:
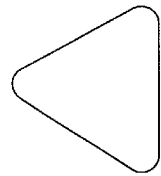
FIG. 2 is a transverse cross-sectional view of an extruded fiber having a delta transverse cross-sectional shape.
Figure 1:
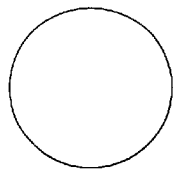
FIG. 1 is a transverse cross-sectional view of an extruded fiber having a circular transverse cross-sectional shape.
Figure 5:
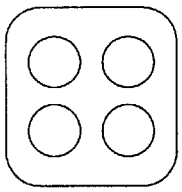
FIG. 5 is a transverse cross-sectional view of an extruded plural-cavity hollow fiber in which four circular longitudinal cavities arranged in a square pattern extend through the fiber having a substantially square transverse cross-sectional shape.
Figure 4:
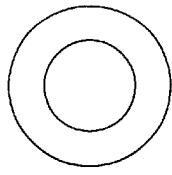
FIG. 4 is a transverse cross-sectional view of an extruded hollow fiber having a circular transverse cross-sectional shape and a single, concentric longitudinal cavity.
Figure 13:
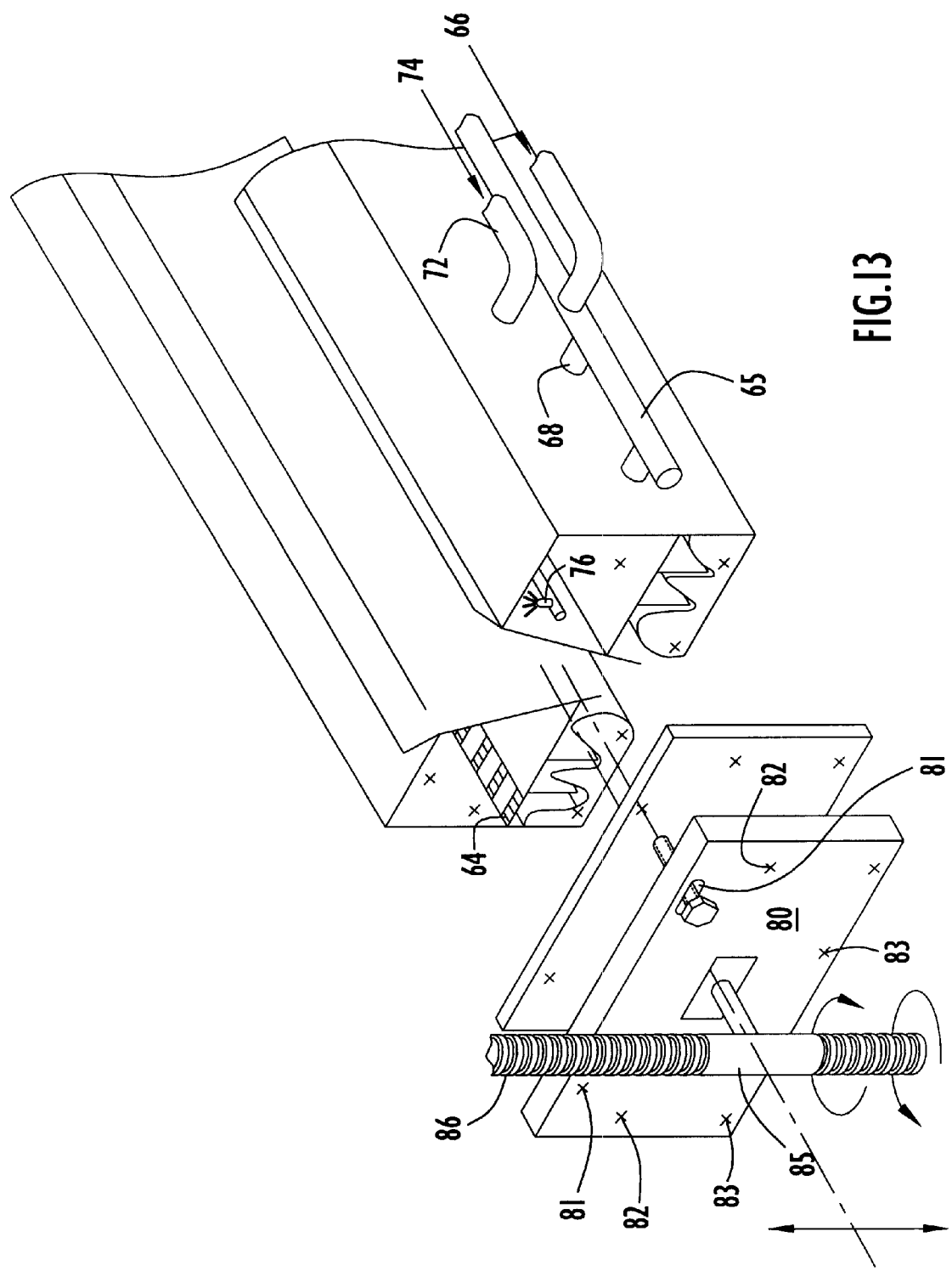
FIG. 13 is an exploded perspective view of the drawing unit of the apparatus shown in FIG. 11.

Referring to FIG. 13, the drawing unit 31 includes on each side the side cover plate 80 connected by a number of bolts 89 through horizontally corresponding extended holes 81, 82, and 83, through which the width of the slots 34 and 44 can be adjusted. A rubber gasket 84 is used between the body of the drawing unit 31 and the side cover plate to seal the unit. The distance between the drawing unit 31 and the web forming table 90 can be adjusted with male screws 86 vertically attached to the side cover plate 80 through matching female screws 85 and driven by a motor with a gear box system 87 attached to the web forming table 90 (see FIG. 1). By turning screws 86, the position of the drawing unit 31 relative to the web forming table 90 can be correspondingly adjusted. FIG. 13 also shows the air supply 66 and water supply conduit 74 attached to input conduits 65, 68, and 72, respectively.

Referring again to FIG. 11, a very important element of this embodiment of the invention is shown. The web forming table 90 is positioned below the slot 32 of the drawing unit 31 to receive fibers F and form the fibers into a non-woven web. The web forming table 90 comprises a vacuum suction box for pulling down fibers onto a moving mesh wire belt conveyor 92 which transports the as-formed web to the next stage of the process for strengthening the web by conventional techniques to produce the final nonwoven fabric web. The web forming table 90 includes the adjustable base 93 which is used to adjust vertically the vertical distance between the top of the table 90 and the spinneret 26 in a range of about 30 to 180 cm. The critical distance between the drawing unit 31 (along the top slot 32) and the lower portion or surface of the spinneret 26 is a critical adjustment and critical distance to accomplish this embodiment of the invention. The distance between the bottom of the spinneret and the top of the drawing unit can be adjusted, preferably between 10 to 90 cm during normal production. The following is an example of an apparatus constructed in accordance with the present invention using polypropylene as the polymer.

In U.S. Pat. Nos. 5,545,371 and 5,688,468, specific examples of spunbond processes using the apparatus shown in FIGS. 11–13 are described, expect that the orifices of the spinneret in these examples are round, thereby producing round fibers. In the course of experimentation to further refine the process described in these patents, the use of a spinneret with slot type orifices (0.12×2.8 mm slot dimensions) was tried in place of a conventional spinneret with the same number of round holes of about 0.25 mm diameter which had been used to form conventional round filaments. It was discovered by the present inventors that the process disclosed in these patents worked even better with the flat, ribbon-shaped fibers that were formed by the slot-shaped orifices. Round orifice and slot orifice spinnerets, each containing 198 orifices, were compared at polymer pumping rates of 0.2 to 0.5 gm/hole/min and at aspirator compressed air pressures of 15 to 35 psig. At the same pumping rate, the slot spinneret produced fibers of about half the equivalent denier of the round spinneret, and the resulting web had roughly double the strength in the machine direction. In terms of filtration capability, when the webs were placed in identical air flows, the webs formed from the ribbon-shaped fibers produced an output air flow velocity approximately one-half that produced by the comparable webs formed from round fibers.

Further, the nonwoven fabric formed from ribbon-shaped fibers could be elongated in the machine direction to a substantially greater length before breaking, relative to nonwoven fabric of the same basis weight formed from round fibers. For example, nonwoven fabric formed from ribbon-shaped fibers having a basis weight of 17 gsm elongated 73% prior to breaking, compared with only 51% for a comparable round fiber nonwoven fabric. Thus, the use of slotted orifice spinnerets to make ribbon cross-section fibers in the process of the referenced patents makes superior spunbonded process and superior spunbonded fabric to a degree that was not expected. The operation of the process was also quite smooth with little vibration of the fibers above the aspirator.

The present invention is not limited to the particular apparatus and processes described above, and additional or modified processing techniques are considered to be within the scope of the invention. For example, the present invention is not limited to above-described bonding process, and other conventional bonding techniques can be employed, including, but not limited to: through-air bonding; needle punching; and hydroentangling (i.e., use of high-pressure water jets). Further, while described in the context of a spunbond process, the ribbon-fibers of the present invention can be applied to web or fabric forming processes that do not require bonding of the fibers. For example applied in spunlaid or air carding processes. Further, the present invention can be applied in melt blown systems.

Moreover, the benefits of using ribbon-shaped fibers are not limited to systems that form webs from continuous filaments. Thus, for example, the present invention encompasses processes for forming nonwoven fabrics from ribbon-shaped staple fibers, wherein the fibers are cut into short fibers prior to forming a web therefrom. One potential advantage of employing staple fibers is that, a more isotropic fabric can be formed, since the staple fibers can oriented in the web in a more random orientation (in contrast to the spunbond case where there is significant fiber orientation in the machine direction).

In addition to nonwoven webs and fabrics composed solely of ribbon-shaped fibers, the ribbon-shaped fibers of the present invention can be used in combination with fibers of other transverse cross sections and in combination with other technologies to form composite materials. For example, other sheet technologies, such as melt blown or film composites (including laminates) can be combined with the ribbon-fiber extrusion process of the present invention. The present invention also encompasses mixed fiber embodiments, wherein ribbon-shaped fibers and conventional (e.g., round) fibers are simultaneously spun from a single spinneret to produce a sheet of mixed fiber composition. The filaments may be composed of two or more different resins, although each individual filament can be composed of a single type of resin. Finally, the present invention encompasses the use of ribbon-shaped fibers in thermobonded applications, whether mixed, laminated or stratified.

The nonwoven fabric formed by the process of the present invention is useful in any product where properties such as softness, strength, stretchability, filtration or fluid barrier properties, and high coverage at a low fabric weight are desirable or advantageous. For example, the nonwoven fabric of the present invention can be used in a variety of commercial products including, but not limited to: diaper liners, sanitary napkins, disposable wipes or other disposable absorbent articles; medical fabrics having barrier properties such as surgical gowns and drapes and sterilization wraps; filtration media and devices; and liners for articles of clothing (e.g., a liner of a jacket).

In particular, nonwoven fabric formed from ribbon-shaped fibers can take the form of a cylindrical filter (see FIG. 14) that can be incorporated into a cigarette to filter smoke inhaled from the cigarette.

Referring to FIG. 15, a nonwoven fabric can be used as an air filter within a ventilation system 200. An air filter 202 is mounted by brackets 204 or other conventional mounting means within a housing 206 which can be a duct of an air distribution system (e.g., HVAC) or a stand-alone housing for a portable air filtration unit. A fan 208 is disposed within housing 206 such that rotation of the impeller of the fan draws air into an inlet of housing 204 and exhausts air out of an air outlet of housing 206, whereby the air flow is drawn through air filter 202 to remove particulate matter, such as dust, from the air.

Having described preferred embodiments of new and improved nonwoven fabrics formed from ribbon-shaped fibers and methods and apparatus for forming the same, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A method of forming a nonwoven fabric from a plurality of extruded polymeric fibers, the method comprising the steps of:

(a) extruding a plurality of substantially vertically-oriented generally ribbon-shaped fibers through slot-shaped orifices of a spinneret;

(b) rapidly quenching the ribbon-shaped fibers to achieve a substantially uniform molecular orientation throughout a transverse cross section of the ribbon-shaped fibers;

(c) drawing the ribbon-shaped fibers longitudinally by exerting a generally downward force produced by an air stream that longitudinally stretches and transversely attenuates the ribbon-shaped fibers in such a manner that the transverse cross-sectional shape of the ribbon-shaped fibers enhances the interaction between the air stream and the ribbon-shaped fibers to maximize said downward force;

(d) depositing the ribbon-shaped fibers onto a surface moving in a predetermined direction to form a web; and (e) processing the web to form the nonwoven fabric.

2. The method of claim 1, wherein step (d) includes depositing the ribbon-shaped fibers onto the moving surface such that the ribbon-shaped fibers lay down more in the predetermined direction than in a direction transverse thereto.

3. The method of claim 1, wherein step (d) includes minimizing gaps between adjacent ribbon-shaped fibers of the nonwoven fabric by depositing the ribbon-shaped fibers onto the surface using suction, such that a transverse cross-section and flexibility of the ribbon-shaped fibers facilitate laying down of the ribbon-shaped fibers in open areas between previously deposited fibers.

4. The method of claim 1, wherein step (a) includes extruding the plurality of ribbon-shaped fibers from the spinneret to have a substantially uniform composition throughout the cross section of the ribbon-shaped fibers.

5. The method of claim 4, wherein the plurality of ribbon-shaped fibers extruded from the spinneret comprise at least one of the following melt spinnable resins: homopolymer and copolymers of polypropylene, polyethylene, polyester, polyactic acid, nylon and polytrimethylene terephthalate.

6. The method of claim 4, wherein the plurality of ribbon-shaped fibers comprise a single polymeric component.

7. The method of claim 1, wherein step (e) includes bonding of the web to form a spunbond fabric.

8. The method of claim 1, wherein step (c) includes drawing the array of fibers through a slot-type aspirator.

9. The method of claim 1, wherein step (c) includes:
   positioning a drawing unit at an initial distance below the spinneret; and
   reducing spacing between the drawing unit and the spinneret while extruding the ribbon-shaped fibers.

10. The method of claim 1, wherein step (c) includes:
    drawing the ribbon-shaped fibers with a drawing unit using an initial air pressure; and
    increasing the air pressure of the drawing unit while extruding the ribbon-shaped fibers.

11. The method of claim 1, wherein step (c) includes controlling the size of the ribbon-shaped fibers by controlling at least one of: the distance between the spinneret and a drawing unit; and the air pressure of the drawing unit.

12. The method of claim 1, further comprising the step of applying a topical treatment to the ribbon-shaped fibers of the nonwoven fabric.

* * * * *